United States Patent
Tonies et al.

[15] 3,646,327
[45] Feb. 29, 1972

[54] METHOD AND APPARATUS UTILIZING UNIQUE CDAB SEQUENCE FOR DETECTING SYNCHRONIZATION ERROR IN RAILWAY VEHICLE READOUT SIGNAL

[72] Inventors: Lawrence A. Tonies; James R. Teasdale, both of Grayslake, Ill.

[73] Assignee: Mangood Corporation, Chicago, Ill.

[22] Filed: Feb. 27, 1970

[21] Appl. No.: 15,067

[52] U.S. Cl. ..................235/92 TC, 177/163, 177/DIG. 8, 235/92 WT, 235/92 EV, 235/92 R, 246/77
[51] Int. Cl. ..................................B61l 1/16, G06m 3/14
[58] Field of Search..................235/92 TC, 92 EV, 92 WT; 340/146.3 K; 177/DIG. 8, 1, 163; 246/77

[56] References Cited

UNITED STATES PATENTS 3,374,844 3/1968 Rogers..................................177/163
3,486,008 12/1969 Mori..................................235/92 R
3,500,039 3/1970 Kortyna..................................246/77

Primary Examiner—Maynard R. Wilbur
Assistant Examiner—Robert F. Gnuse
Attorney—Davis, Lucas, Brewer & Brugman

[57] ABSTRACT

Method and apparatus for detecting synchronism error in a system which activates a readout signal for each vehicle in a train having a mixture of standard four-, six- and eight-axle cars and engines while coupled and in motion. Four axle detectors identified A, B, C and D are arranged in that order along the line of movement of the train. With the A and D detectors spaced 9 feet 4 inches to 11 feet apart, and the B and C detectors approximately evenly spaced between them, they will be actuated in a unique CDAB sequence once per standard, American four-, six- or eight-axle railway vehicle. A synchronism error signal will be activated unless one of four specific combinations of A and D axle detector actuations have occurred when the unique, CDAB sequence occurs.

12 Claims, 6 Drawing Figures

3,646,327

METHOD AND APPARATUS UTILIZING UNIQUE CDAB SEQUENCE FOR DETECTING SYNCHRONIZATION ERROR IN RAILWAY VEHICLE READOUT SIGNAL

CROSS-REFERENCES TO RELATED APPLICATIONS

Reference is made to the following related patent applications, assigned to the same assignee, filed concurrently with this application:

Tonies application Ser. No. 15,066, filed Feb. 27, 1970, on "Method and Apparatus for Generating a Readout Signal Synchronized with Railway Vehicle Movement";

Tonies and Teasdale application Ser. No. 15,068, filed Feb. 27, 1970, on "Method and Apparatus Utilizing Unique CDAB Sequence for Correcting Synchronization Error in Railway Vehicle Readout Signal";

Tonies application Ser. No. 15,140, filed Feb. 27, 1970, on "Method and Apparatus for Identifying Engines in a Train of Railway Vehicles";

Tonies application Ser. No. 15,141, filed Feb. 27, 1970, on "Sequence Detector for Railway Vehicle Control System";

Bailey application Ser. No. 15,142, filed Feb. 27, 1970, on "Circuit for Signaling Alternation Error in Detectors for Railway Vehicle Control System."

BACKGROUND OF THE INVENTION

The field of the invention is generally that of actuating a readout signal which triggers the printing or display of weight, origin, destination, owner, type of load, and other information about individual railway vehicles which are coupled and in motion. This invention is particularly applicable in single- or multidraft weighing of railway vehicles in which individual axle or truck assemblies, or an entire car or engine, are weighed and suitably totalized and printed out or displayed in response to a readout signal which coincides with weighting of the last axle or truck, or of the entire vehicle. The railway vehicles may be coupled or uncoupled and in motion, or stationary on weight scale.

It is important that the readout signal be synchronized with the proper axle or truck of each car. For example, in multidraft weighing, the signal must be synchronized with the last axle or truck of a car, otherwise it will add axle or truck weights from different cars and the total will be meaningless.

A synchronization error signal generated or activated by the present invention may be used with an automatic weighing system and activate an alarm, warning light, or error signal on the printer when the system becomes out of synchronism, or this is imminent.

The problem of synchronizing the readout signal with detection of the first, or last, or any particular axle or wheel assembly in each vehicle of a train is complicated by the fact that trains often comprise random mixtures of four-, six- or eight-axle cars and engines with many different axle spacings and you must identify the number of axles per vehicle before you can count them to determine which is the first, or last, etc.

SUMMARY OF THE INVENTION

A principal object of the present invention is to detect synchronism error in a system which generates a readout signal per vehicle in a train of standard railway vehicles coupled in motion which may comprise a mix of four-, six-, or eight-axle vehicles such as cars and engines.

A specific object of the invention is to detect axle and readout synchronism error in a system of counting axles per vehicle in a train of standard railway vehicles, coupled and in motion, starting with a one-count when each vehicle moves past an axle detector arrangement, and generates a readout signal coincident with a unique count condition which is repeated for each vehicle whether it be a four-, six- or eight-axle vehicle.

Another object is to detect axle and readout synchronism error in a system for generating a readout signal synchronized with the axle count for each vehicle in a train of standard railway vehicles in which the axles of each vehicle are counted beginning with a one-count for the first axle involving the steps as follows:

a. Detecting axle movement past a series of four locations identified A, B, C, and D along the line of movement of the train, the locations being approximately evenly spaced from one another and locations A and D being spaced apart no less then 9 feet 4 inches and no more than 11 feet;

b. Detecting a CDAB sequence of actuation of the axle detectors;

c. Counting the number of axles per vehicle which have passed the locations A and D at the time of occurrence of the CDAB sequence; and d. Activating a synchronism error signal if, upon occurrence of the CDAB sequence, axles counted at locations A and D are anything other than one of the following four combinations:

| | |
|---|---|
| A=3, | D=2 |
| A=4, | D=3 |
| A=5, | D=4 |
| A=1, | D=0 |

Other objects and advantages will be apparent from the following description taken in connection with the drawings in which.

Figure 1:
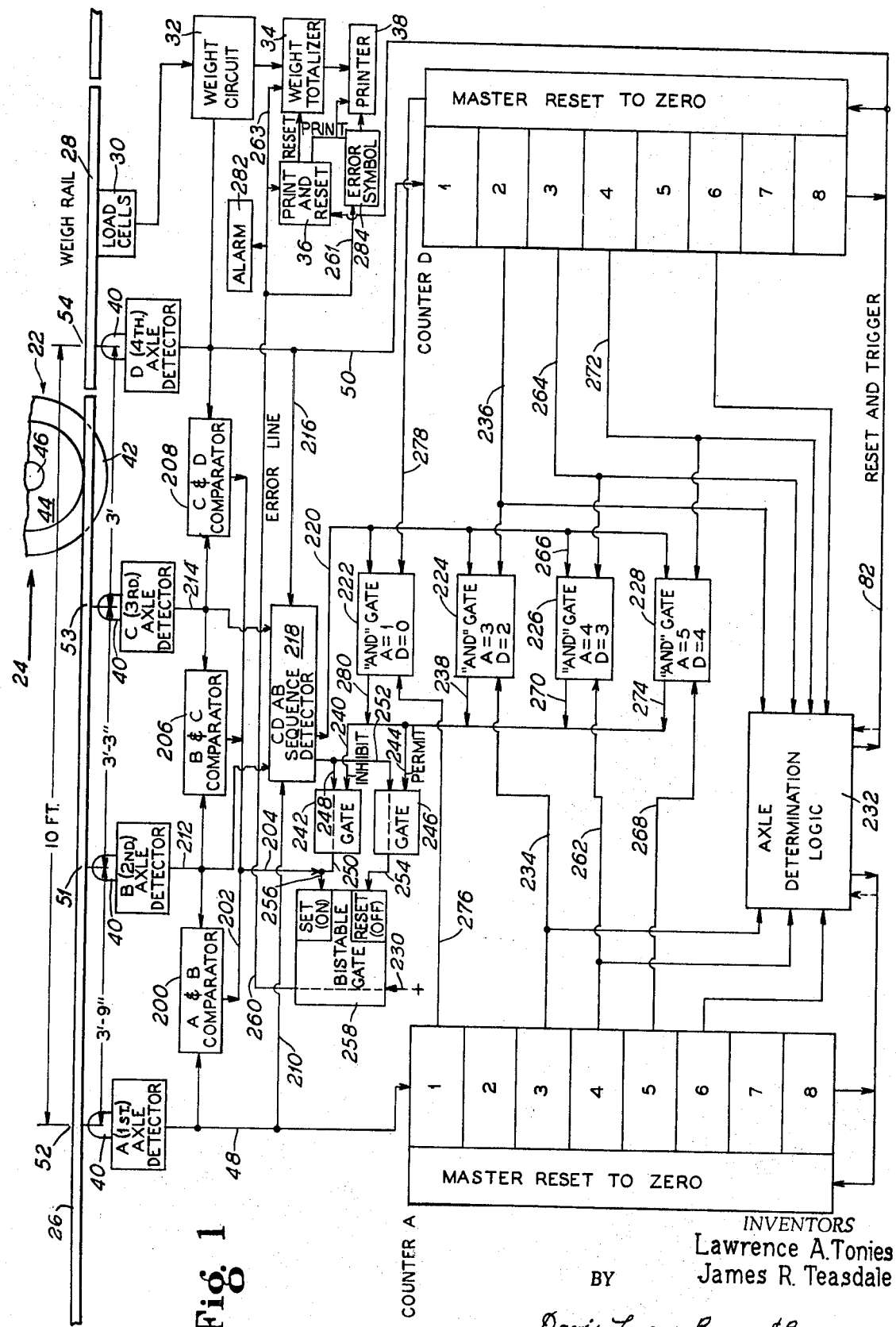
FIG. 1 is a schematic representation of one preferred system employing the principles of the present invention.

Referring now in detail to the drawings, a railway vehicle axle assembly 22 which may be carried by one of the cars 140 through 148 shown in FIGS. 3 through 6 is movable along a line of train movement indicated by the arrow 24. Railway tracks 26 include a small weigh rail section 28 which as one example for axle-by-axle weighing, may be between 4 feet and 4½ feet long, or any other suitable length.

As pointed out above, a readout signal synchronized with movement of one or more of the axle assemblies may be used to trigger the printing or display of many kinds of information about a railway vehicle. In the present case it is illustrated as a multidraft, axle-by-axle weighing system which forms no part of the present invention but which generally is as follows:

The load of one axle assembly 22 on the weigh rails 28 is applied to load cells 30 which are interconnected with a weight circuit 32. The load cells are of known construction, providing an electrical network normally balanced under zero strain condition of the load cells. When the axle assembly load is applied to the weigh rail, the load cells produce an output voltage, the magnitude and phase direction of which are directly dependent upon the extent and direction of unbalance of the network in the load sensing function of the load cells. The voltage produced by the load cells is fed into the weight circuit 32 where it will be converted to a frequency signal proportional to the voltage. The frequency is applied to an electronic counter which counts the number of cycles or pulses for fixed time which may be 0.1 to 1.0 seconds or possibly longer if the weigh rail will accommodate the axle assembly at the speed it is traveling which is usually less than 10 miles per hour. The weight circuit feeds a frequency count signal, showing the weight of each axle assembly on a vehicle, to the weight totalizer 34 which accumulates the weights of all the axle assemblies per vehicle and sends the total to a printer 38 on activation of the readout signal with which the present invention is concerned. When the readout signal, coinciding with the weighing of the last axle of each vehicle, is fed through line 82 to the print and reset command circuit 36, a command will be placed on the weight totalizer 34 to transfer the total accumulated weight of all axles of the vehicle to the printer 38. The weight totalizer will then reset ready to start accumulating axle weights for the following vehicle.

The above is normal operation when the system is in synchronization and no error signal has been generated in accordance with the present invention.

Circuits employing the voltage to frequency conversion of weight data are well known in the art, a few examples of which are Gordon U.S. Pat. No. 3,063,635, Cass, U.S. Pat. No. 3,276,525, and Karlen U.S. Pat. No. 3,173,503 to which reference may be had for details.

First, second, third and fourth axle detectors A, B, C, and D are approximately evenly spaced along the line of movement of the train. More specifically, detectors A and D are spaced approximately 10 feet apart in the circuit illustrated. Detectors A and B are 3 feet 9 inches apart; B and C are 3 feet 3 inches apart; and C and D are 3 feet apart. For proper operation in accordance with this invention, and conforming with standard axle spacings in current American railway practice, detectors A and D should be not less than 9 feet 4 inches apart and not more than 11 feet apart. This exact spacing may be varied somewhat where axle spacings differ from standard American practice.

Each axle detector may be any suitable means for detecting the arrival, presence, or passage of an axle assembly and may be responsive to magnetic, inductive, capacitive, electrical or mechanical characteristics of an axle or wheel. In the present case, each detector is in the nature of a switch having an actuating plunger 40 depressed by flange 42 of each wheel 44 carried by an axle 46.

Counters A and D are connected by lines 48 and 50 to receive pulses from axle detectors A and D to record the count totals of axles moving past one or the other of the locations 52 and 54 along the line of movement of the train. Axle detectors B and C, while having no counters associated with them, indicate movement of an axle assembly past rail locations 51 and 53 respectively.

Before proceeding further with the detailed description the general principles of error determination will be described briefly.

Two independent methods of determining error are included in the system. The first principle involves detector for detector interrogation. Because the maximum spacing between detectors is less than the minimum spacing between axles in standard railway vehicles, the pulses or actuations produced by any two adjacent detectors will alternate. For example, consider detectors A and B. As between these two, the normal sequence would be A B A B A B etc. If one detector misses a count or produces two counts on a single actuation. AA or BB would occur. If this happens an A and B count comparator 200 would generate an error signal on line 202 leading to line 204. B and C count comparator 206 and C and D count comparator 208 are identical in construction and function to the comparator 200. These form no part of the present invention, being the subject of Bailey application Ser. No. 15,142, filed Feb. 27, 1970 to which reference should be made for details.

In addition to the above error detection utilizing count comparators, the system checks for proper conditions of synchronization when the center of the car is over switches C and D, or when two cars are uncoupled and detectors C and D are in the space between two uncoupled cars being hump weighed, that is rolling slowly down a grade containing the weigh rail 28 and the detectors.

Figure 3:
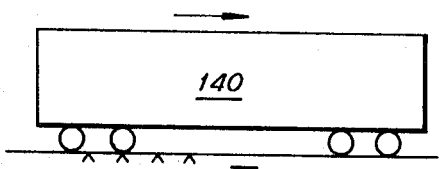
FIG. 3, FIG. 4, FIG. 5 and FIG. 6 are, respectively, views of four-, six-, and eight-axle, railway cars, and a pair of uncoupled cars, all shown in their positions at which time the unique CDAB sequence occurs.
Figure 4:
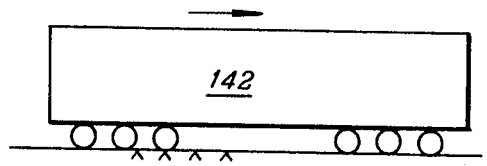
Figure 5:
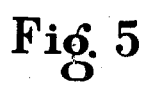
Figure 6:
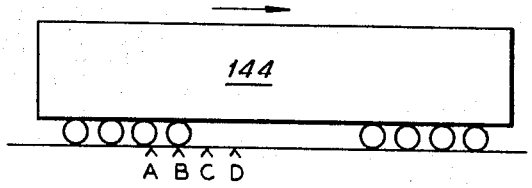

When a vehicle is moving past the detectors, and at the instant shown in FIGS. 3 through 6, a unique "CDAB" sequence has just been completed. That is, the detectors C, D, A and B have been actuated, in that order, and with no intervening detector actuation. When the CDAB sequence is detected, the counts in the A and D counters are examined. These counters should be at one of the following conditions if the system is synchronized:

A=3, D=2, for a four-axle vehicle as shown in FIG. 3
A=4, D=3, for a six-axle vehicle as shown in FIG. 4
A=5, D=4, for an eight-axle vehicle as shown in FIG. 5
A=1, D=0, for the uncoupled condition of FIG. 6, or for a coupled condition where the distance between trucks of adjacent cars exceeds the spacing between detectors A and D.

If one of the above four count combinations exists at the moment the CDAB sequence is completed, the system is synchronized and no error signal will be generated. If any count condition or combination other than one of these four exists, an error signal is detected in accordance with this invention, and an error signal is activated as will now be described.

When each of the axle detectors is actuated, lines 48, 210, 212, 214, and 216 respectively convey signals to the CDAB sequence detector 218. Briefly, this sequence detector filters out and blocks all combinations of signals entering from the axle detectors except for the one, single, unique CDAB sequence and when this occurs it places an output signal on line 220 leading to "AND"-gates 222, 224, 226 and 228. The CDAB sequence detector is the subject of Tonies application Ser. No. 15,141, filed Feb. 27, 1970, to which reference may be made for details.

The "AND"-gates inhibit the error signal if, in one of the vehicle positions of FIGS. 3–6, the axle determination logic 232 is synchronized, that is, counting the first axle of a vehicle as "1," the second axle as "2," etc. The axle determination logic is the subject of Tonies application Ser. No. 15,066, filed Feb. 27, 1970.

If, at the instant the CDAB sequence occurs and a signal is placed in line 220, the three-count totalizer of counter A and the two-count totalizer of counter D are activated, coincident signals will be fed through lines 234 and 236 into gate 224. This will place an output signal on line 238 leading to the inhibit line 240 of gate 242 and the permit line 244 of gate 246.

To clarify nomenclature, it will be understood that the term "INHIBIT" or the initial "I" on a gate control line such as line 240 inhibits or blocks the passage of a signal from line 248 to line 250 through the gate 242.

Likewise, the term "PERMIT" or "P" on the gate control line 244 permits a signal to pass from line 252 to line 254 through the gate 246.

When there is no signal on the inhibit line 240 a signal is free to flow through the gate 242. And when there is no signal on permit line 244 a signal cannot flow through gate 246.

Returning now to the signal on lines 240 from gate 224, the signal from the CDAB sequence detector is blocked at gate 242 and cannot pass through into lines 250 and 256 to set the bistable gate 258. This means that it does not turn on and therefore does not allow the error signal activating gate to place a signal into error lines 260.

If the four-count totalizer of counter A and the three-count totalizer of counter D are activated at the instant the CDAB sequence occurs, lines 262, 264 and 266 will combine input signals to gate 226 and generate an output signal 270 which will have the same effect as the signal in line 238 described above. This is the condition shown in FIG. 2 where a six-axle vehicle is synchronized.

Referring now to the eight-axle vehicle shown in FIG. 5, if it is synchronized when the CDAB sequence occurs, the five-count totalizer of counter A will be activated and the four-count totalizer of counter D will be activated, feeding coincident signals into lines 268 and 272 leading to gate 228. These, coinciding with the CDAB signal in line 220 produce an output signal in line 274 which has the same effect as the signal in line 238 described above.

Referring now to FIG. 6 where two cars are shown uncoupled and moving in the direction of the arrows across the detectors, if the system is synchronized there will be a signal in line 276 from the one-count totalizer of counter A and there will be no signal in line 278 because counter D is at that instant in reset condition. These two conditions in lines 276 and 278, coinciding with the CDAB signal from line 220 will produce an output signal in line 280, again having the same effect as described for the signal in line 238.

The above description has covered the four normal, synchronized conditions in which no signal will be placed on error line 260.

As stated, if the CDAB sequence occurs at a time when the A and D count totalizers read any combinations other than the four named, a signal will be placed in error line 260 indicating the system is out of synchronization. An example of that will now be described.

Assume the system is out of synchronization, that is, for example, one of the counters is reading a "2" on a third axle of a vehicle. Under this condition no signal will pass through any of the "AND"-gates 222, 224, 226 and 228. Note that when the signal on line 240 blocked passage of a signal to set bistable gate 258, the same signal in line 244 permitted a signal to pass from the CDAB sequence detector through lines 252 and 254 to reset bistable gate 258, that is to maintain it in its off position. Now, returning to the condition where the system is out of synchronization and no signal passes through any of the "AND"-gates, there is no inhibit signal in line 240, therefore gate 242 allows the CDAB signal to pass from line 248 to 250 and thence via line 256 to set the bistable gate 258, that is turn it on, and allow the signal to pass through gate 258 into line 260. At the same time, the absence of a signal in gate control line 244 eliminates its "PERMIT" state and blocks passage of signal through gate 246 which would hold it in reset or off position. With the signal in error line 260, this will activate an alarm 282, activate the weight totalizer 34 through line 263, activate the print and reset circuit 36 and an error symbol circuit 284 through line 261 to cause the printer 38 to print an error symbol instead of a weight.

The axle discrimination logic 232 will, when the system is in synchronism, automatically reset the counters when they total 4, 6, or 8, depending on the number of axles of the vehicle, as described in the application referred to.

While it is contemplated that most of the components will be solid-state element, it should be emphasized that a wide range of electrical and electronic components may be used.

Figure 2:
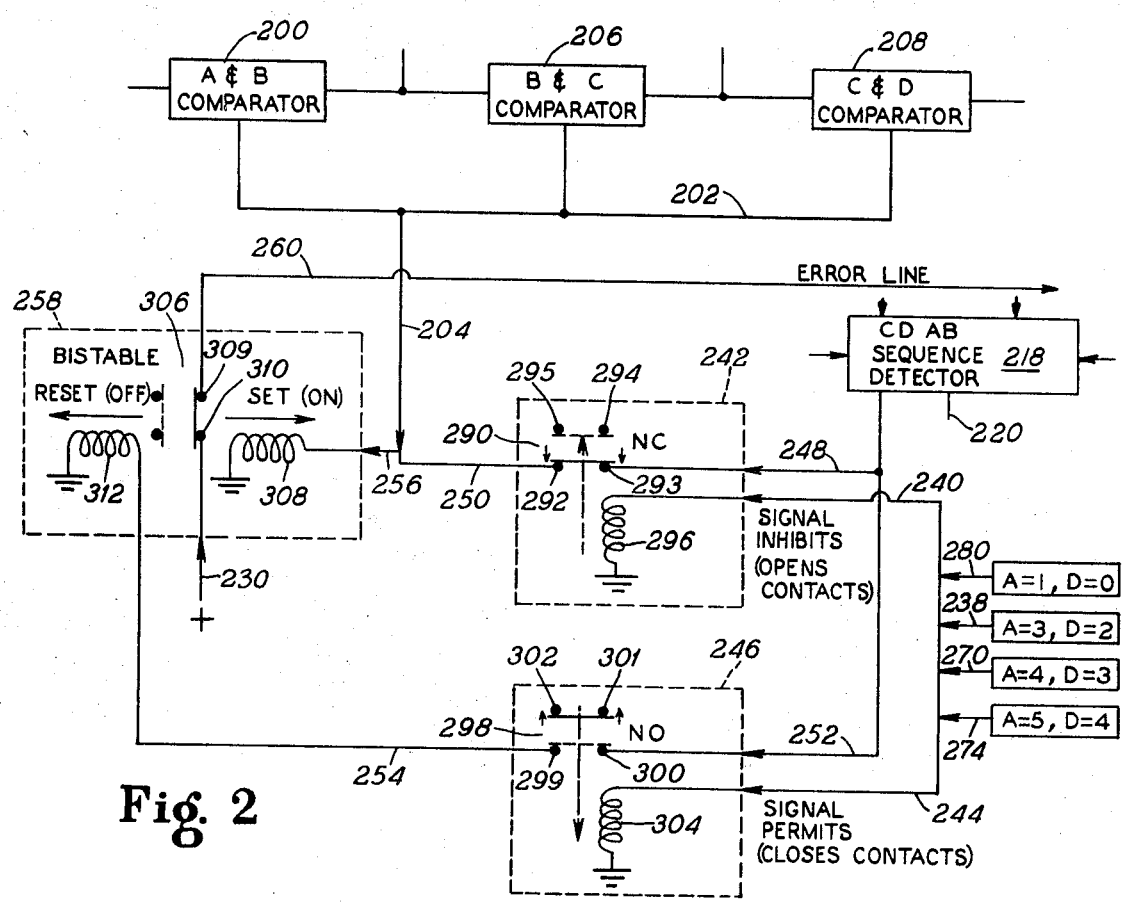
FIG. 2 is an enlarged, detailed portion of FIG. 1.

Just for example, gates 242, 246, 258 are shown with solenoid-operated switches, in FIG. 2.

A normally closed switch 290 has normally closed forward contacts 292, 293 with back contacts 294, 295. Energization of inhibit line 240 activates the coil 296 to open switch 290.

A normally open switch 298 has normally open contacts 299, 300 with back contacts 301, 302. Energization of coil 304 through permit line 244 closes the switch.

The bistable gate 258 in FIG. 2 comprises a switch 306. Energizing set coil 308 closes contacts 309, 310 connecting an error signal generator line 230 with error line 260. Coil 312 opens contacts 309, 310, blocking the error signal generator line from error line 260.

The use of "AND"-gate 222 is optional because the condition of uncoupled hump weighing as shown in FIG. 6 may not be a likely operating condition in some cases and hence it may not be necessary to provide for it.

As stated, the initial and final axle detectors A and D should be spaced between 9 feet 4 inches and 11 feet apart to function with the standard axle spacings employed in standard American railway vehicles. Other spacings may be used where railway vehicle axle spacings differ from those in current, standard American railway practice. Broadly, to function in accordance with the present invention, detectors A and D are spaced apart less than the minimum distance between inner axles on trucks at opposite ends of standard railway vehicle (11 feet in certain ore cars, for example), and more than the maximum distance between adjacent axles on any one truck of a standard railway vehicle (9 feet in certain engines).

We claim as our invention:

1. Apparatus for detecting axle and readout synchronism error in a system for generating a readout signal synchronized with the axle count for each vehicle in a train of standard railway vehicles including:

first, second, third and fourth axle detectors arranged in that order along the line of movement of the train, each detector being actuatable by movement of an axle assembly past it, said detectors being spaced for actuation once per vehicle in a proximate, unique "third + fourth + first+ second" sequence for standard four-, six- and eight-axle cars and engines;

a counter for each of the first and fourth detectors effective to count and totalize the number of axles passing each corresponding detector, and means for programming each of the counters to reset after each has counted the total number of axles on the vehicle;

a sequence detector effective to sense said unique sequence when the intermediate portion of each four-, six-, or eight-axle vehicle is adjacent said axle detectors;

error signal means to indicate one of the counters out of synchronism with the axles;

and means responsive to coincidence of said unique sequence and predetermined combination of the first and fourth detector counter totals to control the activation of said error signal means.

2. Apparatus according to claim 1 in which the first and fourth axle detectors are spaced apart less than the minimum distance between inner axles on trucks at opposite ends of a standard railway vehicle, and more than the maximum distance between adjacent axles on any one truck of standard railway vehicle.

3 Apparatus for detecting axle and readout synchronism error in a system for generating a readout signal synchronized with the axle count for each vehicle in a train of standard railway vehicles including:

first, second, third and fourth axle detectors arranged in that order along the line of movement of the train, each detector being actuatable by movement of an axle assembly past it, said detectors being spaced for actuation once per vehicle in a proximate, unique "third + fourth + first + second" sequence for standard four-, six- and eight-axle cars and engines;

a counter for each of the first and fourth detectors effective to count and totalize the number of axles passing each corresponding detector, and means for programming each of the counters to reset after each has counted the total number of four, six-or eight-axles on the vehicle;

a sequence detector effective to sense said unique sequence when the intermediate portion of each four-, six-, or eight-axle vehicle is adjacent said axle detectors;

error signal means activatable to indicate one of the counters out of synchronism with the axles; and error signal control means responsive to the counters and sequence detector to activate the error signal means upon the coincidence of said unique sequence and any combination of counter totals other than the following list:

| | |
|---|---|
| 1st detector count = 3, | 4th detector count = 2 |
| 1st detector count = 4, | 4th detector count = 3 |
| 1st detector count = 5, | 4th detector count = 4. |

4. Apparatus according to claim 3 in which said list also includes:

| | |
|---|---|
| 1st detector count = 1, | 4th detector count = 0. |

5. Apparatus for detecting axle and readout synchronism error according to claim 3 including display means operable to display information in response to said readout signal, and said error signal means being effective when activated to modify the operation of said display means.

6. Apparatus for detecting axle and readout synchronism error in a system for generating a readout signal synchronized with the axle count for each vehicle in a train of standard railway vehicles including:

first, second, third and fourth axle detectors arranged in that order along the line of movement of the train, each detector being actuatable by movement of an axle assembly past it, said detectors being spaced for actuation once per vehicle in a proximate, unique "third + fourth + first + second" sequence for standard four-, six- and eight-axle cars and engines;

a counter for each of the first and fourth detectors effective to count and totalize the number of axles passing each corresponding detector, and means for programming each of the counters to reset after each has counted the total number of four-, six- or eight-axles on the vehicles;

a sequence detector effective to sense said unique sequence when the intermediate portion of each four-, six-, or eight-axle vehicle is adjacent said axle detectors;

error signal means activatable to indicate one of the counters out of synchronism with the axles;

error signal control means operable in response to the occurrence of said unique sequence to compare the counter totals and to activate said error signal means in response to any combination of counter totals other than the following:

| | |
|---|---|
| 1st detector count = 3, | 4th detector count = 2 |
| 1st detector count = 4, | 4th detector count = 3 |
| 1st detector count = 5, | 4th detector count = 4. |

7. Apparatus for detecting axle and readout synchronism error in a system for generating a readout signal synchronized with the axle count for each vehicle in a train of standard railway vehicles including:

first, second, third and fourth axle detectors arranged that order along the line of movement of the train, each detector being actuatable by movement of an axle assembly past it, said detectors being spaced for actuation once per vehicle in a proximate, unique "third + fourth + first + second" sequence for standard four-, six- and eight-axel cars and engines;

a counter for each of the first and fourth detectors effective to count and totalize the number of axles passing each corresponding detector, and means for programming each of the counters to reset after each has counted the total number of four-, six- or eight-axles on the vehicle;

a sequence detector effective to sense said unique sequence when the intermediate portion of each four-, six-, or eight-axle vehicle is adjacent said axle detectors;

error signal means activatable to indicate one of the counters out of synchronism with the axles;

count comparator effective to compare the total counts on at least the counters for said first and fourth detectors; and error signal control means effective to operate said error signal means on coincidence of said unique sequence and any total combination on said first and fourth detector counters other than the following:

| | |
|---|---|
| 1st detector count = 3, | 4th detector count = 2 |
| 1st detector count = 4, | 4th detector count = 3 |
| 1st detector count = 5, | 4th detector count = 4 |
| 1st detector count = 1, | 4th detector count = 0. |

8. Apparatus for detecting axle and readout synchronism error in a system of generating a readout signal synchronized with the axle count for each vehicle in a train of standard railway vehicles including:

first, second, third and fourth axle detectors arranged in that order along the line of movement of the train, the first and fourth axle detectors being spaced between 9 feet 4 inches and 11 feet apart, each detector being actuatable by movement of an axle assembly past it, said detectors being suitably spaced for actuation once per vehicle in a unique "third + fourth + first + second" sequence for standard four-, six- and eight-axle cars and engines;

a counter for each of the first and fourth detectors effective to count and totalize the number of axles passing each corresponding detector, and means for programming each of the counters to reset after each has counted the total number of four-, six- or eight-axles on a vehicle;

a sequence detector effective to sense said unique sequence when the intermediate portion of each four-, six- and eight-axle vehicle moves past said axle detectors;

an error signal means activatable to indicate one of the counters out of synchronism with the axles;

a count comparator effective to assume a null condition in response to one of the following totals combinations in said counters:

| | |
|---|---|
| 1st detector counter = 3, | 4th detector counter = 2 |
| 1st detector counter = 4, | 4th detector counter = 3 |
| 1st detector counter = 5, | 4th detector counter = 4 | and error signal control means for activating said error signal means in response to the sequence detector and count comparator, said control means being initiated in response to sensing of said unique sequence, and, when initiated, being effective to activate said error signal means in the absence of a null condition in said count comparator.

9. A method for detecting axle and readout synchronism error in system for generating a readout signal synchronized with an axle count condition for each vehicle in a train of standard railway vehicles including the steps of:

detecting axle movements past first, second, third and fourth locations spaced approximately evenly along the line of movement of the train, said first and fourth locations being spaced not less than 9 feet 4 inches and not more than 11 feet apart;

detecting the movement of axles past said locations in a proximate, unique "third location + fourth location + first location + second location" sequence once for each standard four-, six- and eight-axle car and engine;

counting the axles of each vehicle, starting with a one-count for the first axle, moving past the first and fourth locations;

and activating a synchronization error signal if said unique sequence occurs simultaneously with any combination of axle counts at the first and fourth locations other than one of the following:

the third axle has reached the first location when the second axle has reached the fourth location;

the fourth axle has reached the first location when the third axle has reached the fourth location;

the fifth axle has reached the first location when the fourth axle has reached the fourth location; and the first axle has reached the first location when no axle has reached the fourth location.

10. The method of detecting axle and readout synchronism error according to claim 9 in which the first and fourth locations are spaced apart less than the minimum distance between inner axles on trucks at opposite ends of a standard railway vehicle, and more than the maximum distance between adjacent axles on any one truck of a standard railway vehicle.

11. A method for detecting axle and readout synchronism error in a system for generating a readout signal synchronized with an axle count condition for each vehicle in a train of standard railway vehicles including the steps of:

detecting axle movements past first, second, third and fourth locations spaced approximately evenly along the line of movement of the train, said first and fourth locations being spaced not less than 9 feet 4 inches and not more than 11 feet apart;

detecting the movement of axles past said locations in a proximate, unique "third location + fourth location + first location + second location" sequence once for each standard four-, six- and eight-axle car and engine;

counting the axles of each vehicle, upward from a one-count for the first axle and starting over again with a one-count for the first axle of each next vehicle as the axles move past the first and fourth locations;

and activating a synchronization error signal unless said unique sequence occurs simultaneously with one of the following list of combinations of axle counts at the first and fourth locations:
  a three-count at the first location combined with a two-count at the fourth location;
  a four-count at the first location combined with a three-count at the fourth location; and
  a five-count at the first location combined with a four-count at the fourth location.

12. The method according to claim 11 in which said list of combinations of axle counts includes the following:
  a one-count at the first location combined with a zero count at the fourth location.

* * * * *

PO-1050
(5/69)

UNITED STATES PATENT OFFICE
CERTIFICATE OF CORRECTION

Patent No. 3,646,327            Dated February 29, 1972

Inventor(s) Lawrence A. Tonies and James R. Teasdale

It is certified that error appears in the above-identified patent and that said Letters Patent are hereby corrected as shown below:

```
Col. 1, line 37, change "weighting" to --weighing--;
        line 40, change "weight" to --a weigh--.
Col. 2, line 63, change "for fixed" to --for a fixed--.
Col. 5, line 65, change "of standard" to --of a standard--.
Col. 6, line 17, change "and predetermined" to --and a
                 predetermined--;
        line 25, change "of standard" to --of a standard--.
Col. 7, line 28, change "arranged that" to --arranged in that--;
        line 46, change "count" to --a count--;
        line 51, change "total" to --totals--;
        line 60, change "of generating" to --for generating--.
Col. 8, line 23, change "in system" to --in a system--.
```

Signed and sealed this 4th day of July 1972.

(SEAL)
Attest:

EDWARD M.FLETCHER, JR.             ROBERT GOTTSCHALK
Attesting Officer                   Commissioner of Patents